United States Patent [19]

Kaplan et al.

[11] 4,129,538

[45] Dec. 12, 1978

[54] PEPTIZING AGENT FOR NATURAL RUBBER AND SYNTHETIC BUTADIENE-STYRENE RUBBER

[75] Inventors: Earl Kaplan, Metuchen; Frank G. Pinto, Martinsville, both of N.J.

[73] Assignee: American Cyanamid Company, Stamford, Conn.

[21] Appl. No.: 799,047

[22] Filed: May 20, 1977

[51] Int. Cl.² .......................... C09K 3/00; C08C 4/00
[52] U.S. Cl. ............................ 260/23.7 M; 252/182; 260/752; 260/754
[58] Field of Search ................. 260/752, 754, 23.7 M; 252/182

[56] References Cited

U.S. PATENT DOCUMENTS

| | | | |
|---|---|---|---|
| 2,860,116 | 11/1958 | Pikl | 260/30.2 |
| 3,839,250 | 10/1974 | Ehrend et al. | 260/752 |

*Primary Examiner*—V.P. Hoke
*Attorney, Agent, or Firm*—Frank M. Van Riet

[57] ABSTRACT

A peptizing agent for natural rubber and synthetic butadiene-styrene rubber comprising a blend of (A) a mixture of an iron-free peptizer and a zinc salt of mixed fatty acids and (B) an iron phthalocyanine.

12 Claims, No Drawings

PEPTIZING AGENT FOR NATURAL RUBBER AND SYNTHETIC BUTADIENE-STYRENE RUBBER

BACKGROUND OF THE INVENTION

Natural rubber and synthetic butadiene-styrene rubber must be "broken down" or peptized before they are compounded with the various ingredients used in their vulcanization. This has conventionally been accomplished by incorporating a chemical peptizing agent into the rubber by milling on an open rubber mill or by using a Banbury mixer. The effectiveness of the peptization is determined by the decrease in rubber viscosity of the rubber as measured by the Mooney viscosity in accordance with ASTM D1646.

Many peptizing agents have been used in the rubber industry to "break down" rubber in the manner described, including pentachlorothiophenol, zinc pentachlorothiophenate, aryl mercaptans, mercaptobenzothiazole, and the like.

Rubber peptization in the industry is desirably accomplished as rapidly as possible and those peptizing agents or compositions which will reduce the viscosity to the desired level in the shortest period of time at the lowest concentration are preferred. It is also highly desirable to be able to effectively peptize the rubber with a single peptizing agent or composition over a broad range of temperatures e.g., from about 70° C. to as high as about 150° C. Heretofore, such a result has not always been readily accomplished.

For instance, two widely used, commercially accepted products have been available to the rubber industry. One, o,o'-dibenzamidodiphenyl disulfide, has been widely used at high temperatures, i.e., above about 100° C. The other, zinc o-benzamidothiophenate, has been widely used at low temperatures, i.e., up to about 100° C.

The continued acceptance of these two peptizing agents illustrates in general that no single peptizing agent has been available which gives broad temperature peptizing efficacy.

SUMMARY OF THE INVENTION

The present invention constitutes a peptizing composition which effectively peptizes both natural rubber and synthetic butadiene-styrene rubber over a range of temperatures of from about 70° C. to about 150° C. The peptizing compositions comprise (A) a blend of (I) a mixture of an iron-free peptizer and (II) a zinc salt of mixed fatty acids and (B) an iron phthalocyanine.

The compositions of this invention have advantages over previously known peptizers in that: (1) they are effective over a broader range of temperature, (2) they are more effective than their individual component parts and (3) they are more effective at a lower concentration than their component parts.

Thus, while the iron-free peptizer and the iron phthalocyanine are known peptizers individually, it has been found that the combination of the two, in conjunction with the mixed fatty acid zinc salts, function in a manner superior to the components individually, as discussed above.

The known iron-free peptizers, in conjunction with an iron phthalocyanine, are disclosed in U.S. Pat. No. 2,860,116, hereby incorporated herein by reference.

DESCRIPTION OF THE INVENTION INCLUDING PREFERRED EMBODIMENTS

As mentioned above, the first component of the novel compositions of the instant invention comprises a mixture of an iron-free peptizer and a zinc salt of mixed fatty acids. The compositions contain from about 97 to about 99% of the mixture, the ingredients of which are present in a molar ratio of about 1:2 to about 2:1, respectively, preferably about 1:1. The second component of the novel compositions of the instant invention comprises from about 1.0% to about 3.0% of an iron phthalocyanine.

The iron-free peptizers useful herein include:

1. The organic mercaptans such as pentachlorothiophenol, xylyl mercaptan, tetrachlorobenzenedithiol, mercaptobenzothiazole and the like, 2. the organic disulfides such as dibenzoyl disulfide, o,o'-dibenzamidodiphenyl disulfide, dibenzothiazyl disulfide, pentachlorophenyl disulfide, 3. the zinc salts of organic mercaptans such as zinc pentachlorothiophenol, zinc xylyl mercaptan, zinc o-benzamidothiophenol, 4. and mixtures of the above peptizers. Those peptizers which are preferred include pentachlorothiophenol, zinc pentachlorothiophenol, pentachlorophenyl disulfide, xylyl mercaptan, zinc xylyl mercaptan and o,o'-dibenzamidodiphenyl disulfide.

The mixtures of zinc fatty acids as used herein, include the zinc salts of mixtures of fatty acids having from 14 to 20 carbon atoms i.e., the mixed zinc salts of mixed fatty acids having from 14 to 20 carbon atoms. Also, a mixture of said fatty acids in combination with a zinc compound capable of forming such a fatty acid salt, or its equivalent, on heating suitable proportions thereof for a short period of time at about 70°–100° C., such as, for example, zinc oxide, zinc chloride, zinc sulfate, and the like may be used. The useful fatty acid zinc salt mixtures must have a melting point below about 115° C., i.e., be liquid below 115° C. A useful fatty acid mixture is commercially available as Neofat 65 (Armak Corp.) and comprises 40% oleic acid, 29% palmitic acid, 18% stearic acid, 3% myristic acid, 3.5% palmitoleic acid, 3.5% linoleic acid, 1% margaric acid, 1% myristoleic acid, 0.5% pentadecylic acid and 0.5% linolenic acid. Similar useful commercially available fatty acid mixtures include Emery 531 (Emery Industries, Inc.) which comprises 3% myristic acid, 1½% pentadecanoic acid, 26½% palmitic acid, 42% oleic acid, 3% linoleic acid, 1% linolenic acid, 1% margaric acid, 17% stearic acid and 5% palmitoleic acid and PPG T-22 (PPG Industries, Inc.) which comprises 3% myristic acid, 0.5% $C_{12}$ and lower acids, 0.5% pentadecanoic acid, 25% palmitic acid, 1% margaric acid, 18% stearic acid, 3% palmitoleic acid, 43% oleic acid, 4% linoleic acid, 0.5% linolenic acid, 1% myristoleic acid and 0.5% hexadecadieneoic acid. It has been found that mixtures of zinc fatty acid salts resulting from a mixture of fatty acids are required since these mixtures are more readily dispersed in the rubber because they are liquids below about 115° C.

The iron phthalocyanines are known peptizing agents for rubber. Their use for this purpose is disclosed by Pikl, U.S. Pat. No. 2,860,116. Suitable iron phthalocyanines include iron phthalocyanine per se, iron trinitrophthalocyanine, iron mono 4-chlorophthalocyanine, mixtures thereof and the like.

It has been found that it is desirable to incorporate an inert filler material to the above-described compositions to aid in blending and to provide a free-flowing, non-caking powder. The nature of the filler is not critical as long as it is inert. Most known clays and silica compounds such as hydrated calcium silicate may be used. The filler containing composition may be prepared in any convenient way, for example, using a ribbon blender, to provide a free-flowing homogeneous solid mixture. The filler should be used in amounts ranging from about 30 to about 70%, by weight, based on the weight of the above composition, i.e., 30–70% of the filler and 70–30% of the peptizer-zinc salt-iron phthalocyanine composition.

The compositions of the invention are useful in peptizing both natural rubber and synthetic butadiene-styrene rubber at a temperature of about 70° C. to 150° C. Effective peptization will vary with the temperature and concentration of peptizing agent employed, however, from about 0.1% to 1% peptizer composition can be used, preferably 0.25 to 0.5%, by weight, based on the weight of the rubber.

As mentioned above, peptization is determined by the decrease in Mooney viscosity (ML4 at 212° F.) of the rubber following mixing with the peptizer composition for several minutes. Small differences in Mooney viscosity are significant for a given concentration and temperature. Since peptization in industry is desirably accomplished in the minimum amount of time, those compositions which will reduce the viscosity to the desired level in the shortest time at the lowest concentration are preferred.

The following examples are set forth for purpose of illustration only and are not to be construed as limitations on the present invention except as set forth in the appended claims. All parts and percentages are by weight unless otherwise indicated.

EXAMPLE 1

Natural rubber is milled on an open rubber mill for 10 minutes at 70° C. with the various peptizer compositions shown below at different concentrations. Following milling, the Mooney viscosity is measured for each milled rubber sample. Results are shown in Table I, below.

PEPTIZING COMPOSITIONS

A. Zinc salts of mixed fatty acids of 14–20 carbon atoms (commercially available)
B. Iron phthalocyanine
C. o,o'-dibenzamidodiphenyldisulfide
D. Mixture of:
 1. 25% zinc salts of mixed fatty acids of 14–20 carbon atoms (liquid at 50°–60° C.)
 2. 25% o,o'-dibenzamidodiphenyldisulfide
 3. 49% hydrated calcium silicate (inert filler)
 4. 1% iron phthalocyanine

TABLE I

| | Sample | Conc. % by wt. | Mooney Viscosity** |
|---|---|---|---|
| 1. | Natural rubber-unmilled | — | 96 |
| 2. | Natural rubber-milled | — | 55 |
| 3. | Composition A | 0.25 | 56 |
| 4. | Composition A | 0.50 | 56 |
| 5. | Composition B | 0.1 | 46 |
| 6. | Composition B | 0.2 | 44 |
| 7. | Composition A | 0.24 | 54.5 |
|  | Composition B | 0.01 |  |
| 8. | Composition A | 0.48 | 53.5 |
|  | Composition B | 0.02 |  |
| 9. | Composition C | 0.25 | 47 |
| 10. | Composition C | 0.50 | 43.5 |
| 11. | Composition D | 0.25 | 43 |
| 12. | Composition D | 0.50 | 37.5 |

**Mooney Viscosity, ML-4 at 212° F.

The data shown in the foregoing table illustrate the following: (1) the zinc salts of mixed fatty acids alone have no peptizing effect; (2) iron phthalocyanine at 0.1% and 0.2% has some peptizing effect; (3) the zinc salts of mixed fatty acids catalyzed with iron phthalocyanine (Samples 7 and 8) have very little efficacy; (4) o,o'-dibenzamidodiphenyldisulfide is about as effective at low temperature as iron phthalocyanine; (5) the compositions of the invention, which contain only 0.0025% (Sample 11) and 0.005% (Sample 12) part iron phthalocyanine, exhibit a surprising synergistic effect in peptizing natural rubber.

EXAMPLE 2

The procedure of Example 1 is repeated except that the rubber and peptizer compositions are mixed in a Banbury mixer for 4 minutes at 150° C. Results are shown in Table II, below.

TABLE II

| | Sample | Conc. % by wt. | Mooney Viscosity |
|---|---|---|---|
| 1. | Natural rubber-no peptizer | — | 65.5 |
| 2. | Composition A | 0.25 | 65.5 |
| 3. | Composition A | 0.50 | 65 |
| 4. | Composition B | 0.1 | 47.5 |
| 5. | Composition B | 0.2 | 45.5 |
| 6. | Composition A | 0.24 | 61.5 |
|  | Composition B | 0.01 |  |
| 7. | Composition A | 0.48 | 63 |
|  | Composition B | 0.02 |  |
| 8. | Composition C | 0.25 | 41 |
| 9. | Composition D | 0.25 | 40.5 |
| 10. | Composition D | 0.50 | 33 |

Comparison of Sample 8 with Sample 9 illustrates that the compositions of the invention, which contain only 0.0025 part iron phthalocyanine and 0.063 part of o,o'-dibenzamidodiphenyldisulfide, are at least as good a peptizer at 150° C. as o,o'-dibenzamidodiphenyldisulfide, a well-known high temperature peptizer, at 0.25 part. The table illustrates the synergistic activity of the invention.

EXAMPLE 3

When the procedure of Example 1 is repeated except that a synthetic butadiene-styrene rubber is used instead of natural rubber, similar results are obtained.

EXAMPLE 4

The following peptizer composition is prepared:

| Component | Parts by Weight |
|---|---|
| o,o'-dibenzamidodiphenyldisulfide | 25.0 |
| Zinc salts of mixed ($C_{14}$-$C_{18}$) fatty acids (liquid at 50-60° C) | 25.0 |
| Hydrated calcium silicate | 49.5 |
| Iron phthalocyanine | 0.5 |
| | 100.0 |

100 Parts, by weight, of natural rubber are mixed on an open rubber mill for 4 minutes at both 70° C. and 100° C. with 0.5 part, by weight, of the foregoing composition. The Mooney viscosity results are shown below.

| Sample | Mooney Viscosity ML-4 at 212° F. |
|---|---|
| Milled at 70° C. | 33 |
| Milled at 100° C. | 26 |

EXAMPLE 5

The procedure of Example 4 is followed except that the composition comprises:

| Component | Parts by Weight |
|---|---|
| o,o'-dibenzamidodiphenyldisulfide | 30.0 |
| Zinc salts of mixed ($C_{14}$–$C_{20}$) fatty acids (liquid at 50–60° C) | 20.0 |
| Hydrated calcium silicate | 49.5 |
| Iron phthalocyanine | 0.5 |
|  | 100.0 |

Similar results are obtained.

EXAMPLE 6

The procedure of Example 4 is followed except that the composition comprises:

| Component | Parts by Weight |
|---|---|
| o,o'-dibenzamidodiphenyldisulfide | 20.0 |
| Zinc salts of mixed ($C_{14}$–$C_{18}$) fatty acids (liquid at 50–60° C) | 30.0 |
| Hydrated calcium silicate | 48.5 |
| Iron phthalocyanine | 1.5 |
|  | 100.0 |

Similar results are obtained.

EXAMPLE 7

The procedure of Example 4 is followed except that the composition comprises:

| Component | Parts by Weight |
|---|---|
| o,o'-dibenzamidodiphenyldisulfide | 40.0 |
| Zinc salts of mixed ($C_{14}$–$C_{20}$) fatty acids (liquid at 50–60° C) | 20.0 |
| Hydrated calcium silicate | 39.0 |
| Iron phthalocyanine | 1.0 |
|  | 100.0 |

Similar results are obtained.

EXAMPLE 8

The procedure of Example 4 is followed except that the composition comprises:

| Component | Parts by Weight |
|---|---|
| o,o'-dibenzamidodiphenyldisulfide | 20.0 |
| Zinc salts of mixed ($C_{14}$–$C_{20}$) fatty acids (liquid at 50–60° C) | 40.0 |
| Hydrated calcium silicate | 38.5 |
| Iron phthalocyanine | 1.5 |
|  | 100.0 |

Similar results are obtained.

EXAMPLE 9

The procedure of Example 4 is again followed except that the disulfide is replaced by pentachlorothiophenol. An effective peptizer composition results.

EXAMPLE 10

Again following the procedure of Example 4 except that the disulfide is replaced by pentachlorophenyl disulfide, similar results are achieved.

EXAMPLE 11

The disulfide of Example 4 is replaced by the zinc salt of pentachlorothiophenol. Again, an excellent peptizer composition is recovered.

EXAMPLE 12

Replacing the disulfide of Example 4 with xylyl mercaptan results in an effective peptizer composition of similar properties.

EXAMPLE 13

Example 12 is again followed except that the zinc salt of xylyl mercaptan is used in place of the xylyl mercaptan per se. Analogous results are observed.

EXAMPLE 14

The procedure of Example 1 (Composition D) is again followed except that the hydrated calcium silicate is omitted. The resultant composition comprises 49% of the fatty acid zinc salts, 49% of the disulfide and 2% of the iron phthalocyanine. The peptizing effects of the resultant composition are substantially identical to those shown in Table I.

EXAMPLE 15

Again following the procedure of Example 1 (Composition D) except that the final composition comprises 15% zinc fatty acid salts, 15% disulfide, 69% hydrated calcium silicate and 1% iron phthalocyanine, excellent results are achieved.

EXAMPLE 16

The procedure of Example 9 is again followed except that the composition comprises 35% pentachlorothiophenol, 35% zinc fatty acid salts, 29% inert filler and 1% iron trinitrophthalocyanine. Similar results are obtained.

EXAMPLE 17

The procedure of Example 11 is again followed except that the salts are the zinc salts of mixed fatty acids comprising 3% myristic acid, 1.5% pentadecanoic acid, 26.5% palmitic acid, 1% margaric acid, 17% stearic acid, 5% palmitoleic acid, 42% oleic acid, 3% linoleic acid and 1% linolenic acid being liquid at about 50°–60° C. Substantially identical results are obtained.

EXAMPLE 18

Replacement of the iron phthalocyanine of Example 2 (Composition D) with iron mono 4-chlorophthalocyanine results in the production of a peptizing composition of equivalent peptizing effect.

EXAMPLES 19–21

Elimination of the hydrated calcium silicate from the compositions of Examples 2 (Composition D), 4 and 7 does not effect the overall peptizing effect of the resultant composition.

EXAMPLE 22

Composition D of Example 14 is again prepared and tested for its peptizing ability except that the zinc salts are replaced by the zinc salts of a fatty acid mixture comprising 3% myristic acid, 0.5% $C_{12}$ and lower acids, 0.5% pentadecanoic acid, 25% palmitic acid, 1% margaric acid, 18% stearic acid, 3% palmitoleic acid, 43% oleic acid, 4% linoleic acid, 0.5% linolenic acid, 1% myristoleic acid and 0.5% hexadecadieneoic acid being liquid at about 50°–60° C. Substantially identical results are achieved.

We claim:

1. A peptizing composition for natural rubber and synthetic butadiene-styrene rubber comprising (A) from about 97% to about 99%, by weight, based on the weight of said composition, of a mixture of (1) an iron-free peptizer selected from the group consisting of (a) organic mercaptans, (b) organic disulfides, (c) zinc salts of organic mercaptans and (d) mixtures thereof and (2) the zinc salts of a mixture of fatty acids containing from about 14 to about 20 carbon atoms having a melting point below about 115° C. and (B) from about 1.0% to about 3.0%, by weight, same basis, of an iron phthalocyanine, the weight ratio of (1) to (2) ranging from about 2:1 to about 1:2, respectively.

2. A composition according to claim 1 wherein said (1) is o,o'-dibenzamidodiphenyldisulfide.

3. A composition according to claim 1 wherein said (1) is pentachlorothiophenol.

4. A comyosition according to claim 1 wherein said (1) is pentachlorophenyl disulfide.

5. A composition according to claim 1 wherein said (B) is iron phthalocyanine.

6. A composition according to claim 1 wherein said (2) is the zinc salts of a mixture of acids comprising 40% oleic acid, 29% palmitic acid, 18% stearic acid, 3% myristic acid, 3.5% palmitoleic acid, 3.5% linoleic acid, 1% margaric acid, 1% myristoleic acid, 0.5% pentadecyclic acid and 0.5% linolenic acid.

7. A composition according to claim 1 containing, in admixture therewith, an inert filler, the amount of said filler ranging from about 30% to about 70%, by weight, based on the weight of said composition.

8. A composition according to claim 1 wherein (1) is o,o'-dibenzamidodiphenyldisulfide, (2) is the zinc salts of a mixture of acids comprising 40% oleic acid, 29% palmitic acid, 18% stearic acid, 3% myristic acid, 3.5% palmitoleic acid, 3.5% linoleic acid, 1% margaric acid, 1% myristoleic acid, 0.5% pentadecyclic acid and 0.5% linolenic acid and (B) is iron phthalocyanine.

9. A composition according to claim 1 wherein the ratio of (1) to (2) is about 1:1.

10. A composition according to claim 7 wherein (1) is o,o'-dibenzamidodiphenyldisulfide, (2) is the zinc salts of a mixture of acids comprising 40% oleic acid, 29% palmitic acid, 18% stearic acid, 3% myristic acid, 3.5% palmitoleic acid, 3.5% linoleic acid, 1% margaric acid, 1% myristoleic acid, 0.5% pentadecyclic acid and 0.5% linolenic acid and (B) is iron phthalocyanine.

11. A method for peptizing natural rubber and synthetic butadiene-styrene rubber at from about 70° C. to about 150° C. which comprises incorporating therein from about 0.1 to about 1.0 weight percent of the composition of claim 1.

12. A method for peptizing natural rubber and synthetic butadiene-styrene rubber at from about 70° C. to about 150° C. which comprises incorporating therein from about 0.1 to about 1.0 weight percent of the composition of claim 7.

* * * * *